(12) United States Patent
Saborio et al.

(10) Patent No.: US 7,997,229 B2
(45) Date of Patent: Aug. 16, 2011

(54) WATER SPRINKLER FOR DOGS

(75) Inventors: Juan Carlos Saborio, San Mateo, CA (US); Andreana Louise Ososki, San Mateo, CA (US)

(73) Assignee: Juan Carlos Saborio, San Mateo, CA (US)

( * ) Notice: Subject to any disclaimer, the term of this patent is extended or adjusted under 35 U.S.C. 154(b) by 236 days.

(21) Appl. No.: 12/289,552

(22) Filed: Oct. 30, 2008

(65) Prior Publication Data

US 2009/0114166 A1 May 7, 2009

Related U.S. Application Data

(60) Provisional application No. 61/001,289, filed on Nov. 1, 2007.

(51) Int. Cl.
*A01K 7/00* (2006.01)
*A01K 29/00* (2006.01)
(52) U.S. Cl. .......................... 119/72; 119/709
(58) Field of Classification Search .............. 119/72, 119/604, 702, 709; D23/222, 256, 215; 239/211
See application file for complete search history.

(56) References Cited

U.S. PATENT DOCUMENTS

| | | | | | |
|---|---|---|---|---|---|
| 4,078,792 | A | * | 3/1978 | Arato | 472/137 |
| 5,261,603 | A | * | 11/1993 | Driska | 239/211 |
| 5,649,502 | A | * | 7/1997 | Frank | 119/665 |
| 6,405,681 | B1 | * | 6/2002 | Ward | 119/707 |
| 2002/0073927 | A1 | * | 6/2002 | Chamberlain | 119/72 |
| 2009/0266306 | A1 | * | 10/2009 | Edwards et al. | 119/709 |

* cited by examiner

*Primary Examiner* — Rob Swiatek
*Assistant Examiner* — Kristen C Hayes

(57) ABSTRACT

A water sprinkler specifically designed for exercising and entertaining dogs that is composed of a highly-durable, non-toxic, flexible, plastic, or like material having perforations for water to spray. Dogs entertain themselves in water sprinklers, however, water sprinklers are often not durable and do not withstand dogs biting them. Dogs can also harm themselves by biting sharp material used to manufacture most standard water sprinklers. This invention is a durable rubber or similar material bone water sprinkler that connects to a standard garden water hose. Dogs can pick it up in their mouths to move it around, nip at the spraying water, and chew on the water sprinkler safely. The body of the sprinkler is shaped in a manner that encourages play even without water spraying from the perforations. The water sprinkler for dogs addresses the chewing and biting issue characteristic of dogs when playing with water sprinklers.

1 Claim, 7 Drawing Sheets

WATER SPRINKLER FOR DOGS

CROSS-REFERENCE TO RELATED APPLICATIONS

A provisional patent was filed on Nov. 1, 2007 for this invention (application No. 61/001,289).

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention is a pet exercising and entertainment water sprinkler device. Dogs play and entertain themselves in water sprinklers, however, water sprinklers are often not durable enough for dogs and do not withstand dogs biting them.

In reviewing prior art, we did not find any water sprinklers that were designed for dogs. Dogs often bite at water sprinklers, often destroying the sprinkler and sometimes this can cause injuries to dogs due to the type of material water sprinklers are made of. Many water sprinklers have hard plastic parts or aluminum parts (i.e. U.S. Pat. Nos. 7,090,146, D390, 312, 4,597,528). These materials easily crack, bend, or are destroyed when dogs try to bite at them, becoming a hazard for dogs. Water sprinklers designed for recreational use (i.e. U.S. Pat. Nos. 3,873,026, 6,050,501) are also not designed for dogs nipping at them. In reviewing toys for dogs, there are many plastic bone designs (i.e. United States Patent numbers 20060102099, 20060225667, U.S. Pat. No. 5,263,436) for dogs to play with and chew. Some inventions provide dogs with fresh water in a bowl via a garden hose and/or sprinkler system (United States Patent 20060249224). However, durable water sprinklers designed specifically for dogs that can be attached to a garden hose are unavailable on the market.

The water sprinkler device for dogs allows a dog to play in the spraying water which provides exercise and a way to cool down on hot days. The rubber material of the device is designed to withstand biting and chewing. This device is designed for a dog to be entertained, have exercise, and chew or bite the device safely.

This device is new because it is a water sprinkler especially designed for dogs. Specifically it is a water sprinkler shaped as a bone which is composed of a durable, non-toxic, resilient rubber material that connects to a standard garden hose. Dogs can run in the spraying water and chase the water. They can also nip at the water and chew on the water sprinkler without injuring themselves or the device due to the resilient material the device is made of. The invention is a toy that dogs can pick up in their mouths and move around. The water sprinkler for dogs safely addresses the chewing and biting issue characteristic of dogs when playing with sprinklers.

BRIEF SUMMARY OF THE INVENTION

This invention is an animal specific exercising and entertainment water sprinkler device. The objective of this invention is to provide entertainment, safety and exercise for dogs. Dogs entertain themselves in water sprinklers, however, water sprinklers are often not durable enough for dogs and do not withstand dogs biting them. In addition, dogs can harm themselves by biting the sharp material used to manufacture most standard water sprinklers.

Another objective of this invention is to provide a dog toy that is safe for dogs by using material that dogs can bite safely. The sprinkler device will be manufactured out of hard rubber, plastic, or any other suitable satisfactory material providing an aesthetically pleasing and refined appearance and being safe, resilient, and non-toxic to dogs.

The water sprinkler is shaped in the form of a bone to further attract the dog to the toy. The sprinkler connects to a water source to spray water and allowing dogs to pick it up in their mouths and move it around. Dogs can nip at the spraying water and chew on the water sprinkler without injuring themselves or the device. The water sprinkler for dogs addresses the chewing and biting issue characteristic of dogs when playing with sprinklers.

BRIEF DESCRIPTION OF THE VIEWS OF THE DRAWING

List of Figures

DETAILED DESCRIPTION OF THE INVENTION

The invention is a water sprinkler toy for entertaining and exercising dogs. This invention attaches to a standard garden water hose. The water sprinkler for dogs is made of durable, non-toxic, resilient rubber or similar material in the shape of a bone with small perforations where water sprays out. One end of the apparatus is open and water flows through a garden hose and into the compartment where the water is then discharged through apertures on the top of the device.

The features of the present invention will be better understood with reference to the detailed description of each drawing discussed below.

Figure 1:
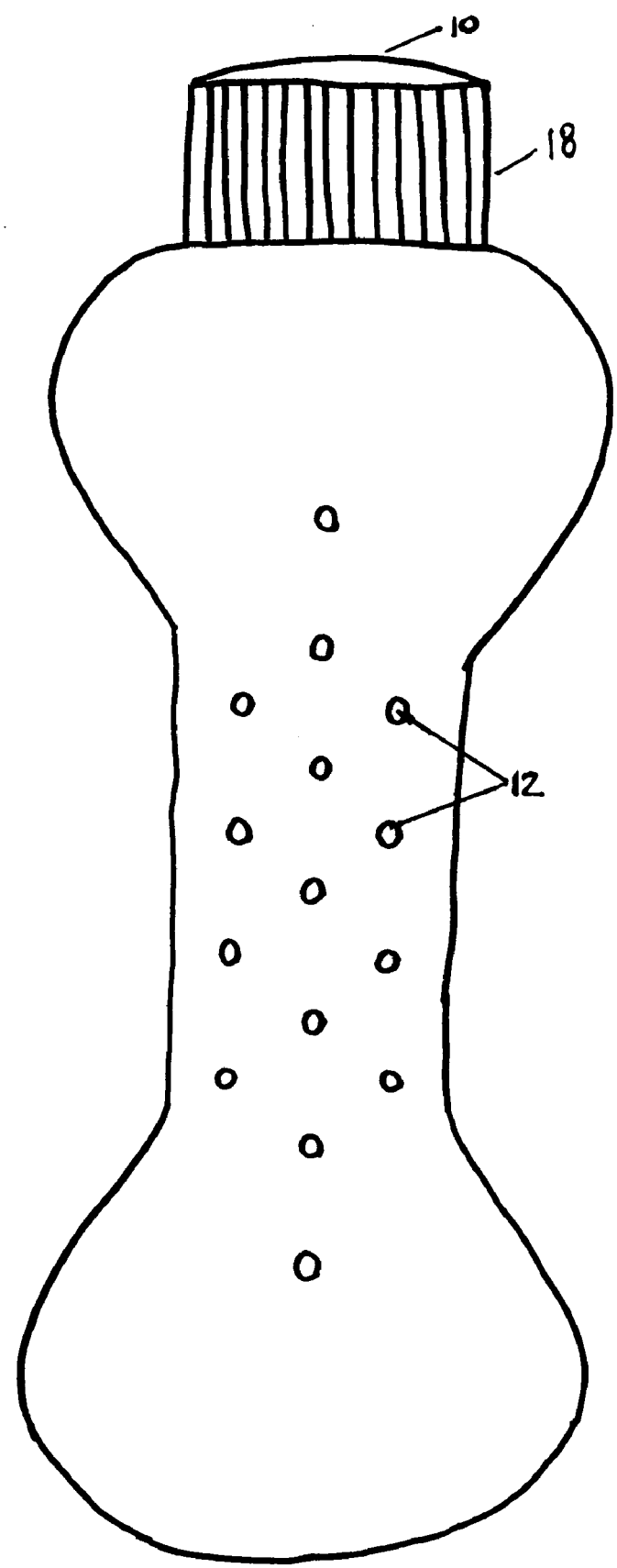
FIG. 1 is a top view of the water sprinkler with perforations.
Figure 2:
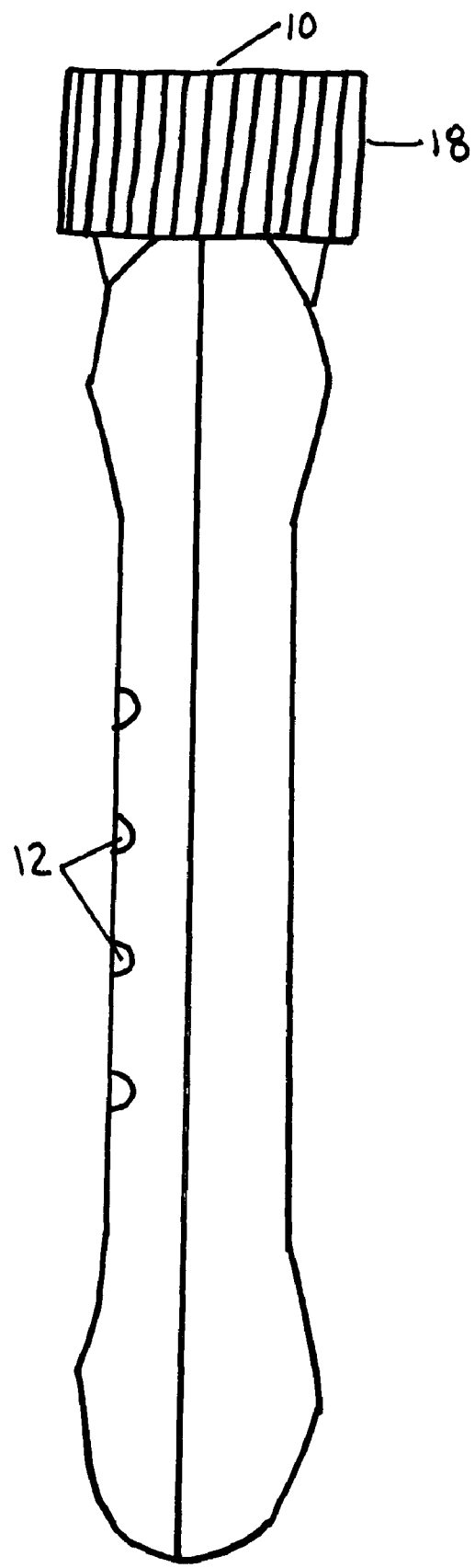
FIG. 2 is a side view of the device.
Figure 3:
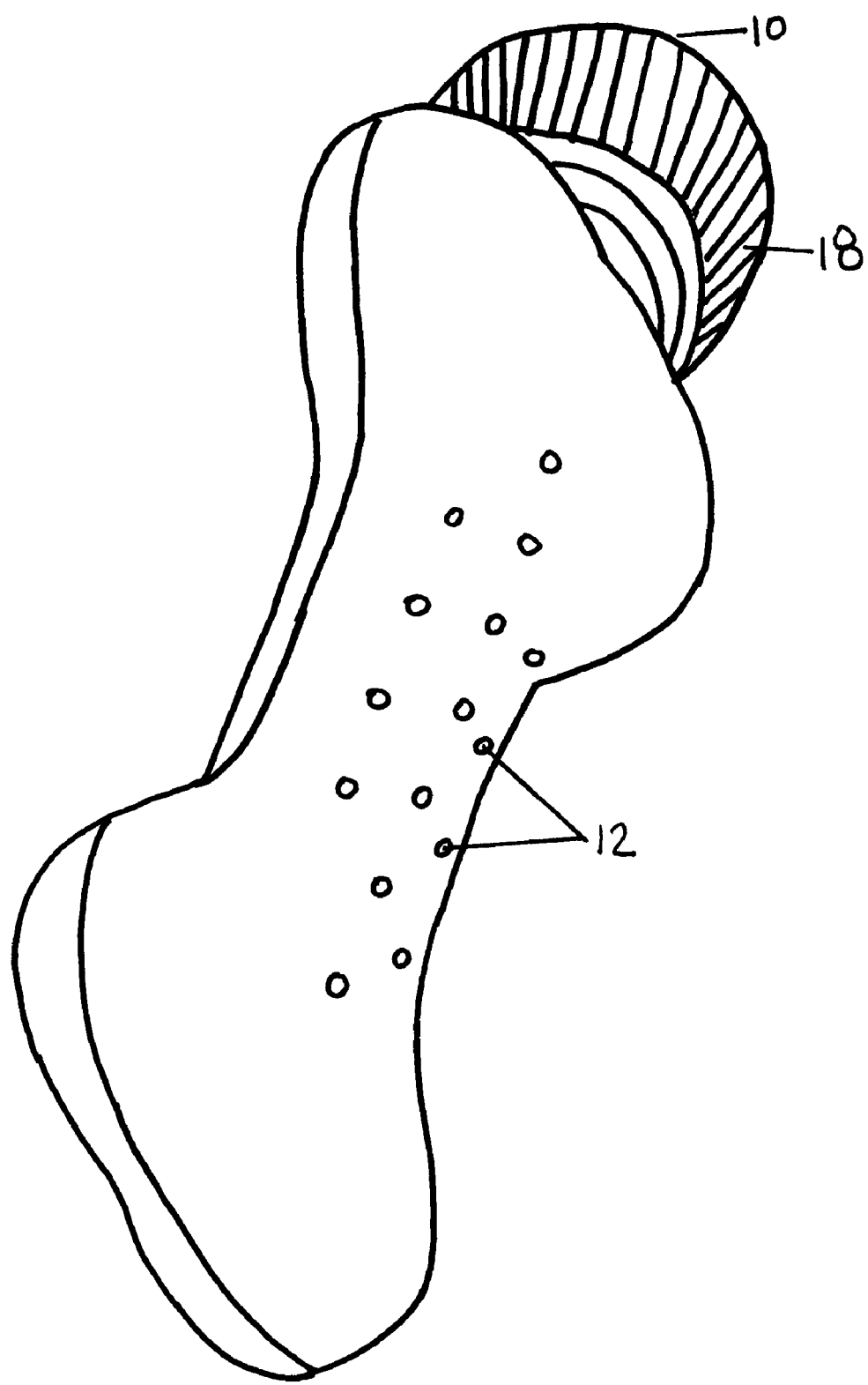
FIG. 3 is an additional external view showing the top and side view of the apparatus.
Figure 4:
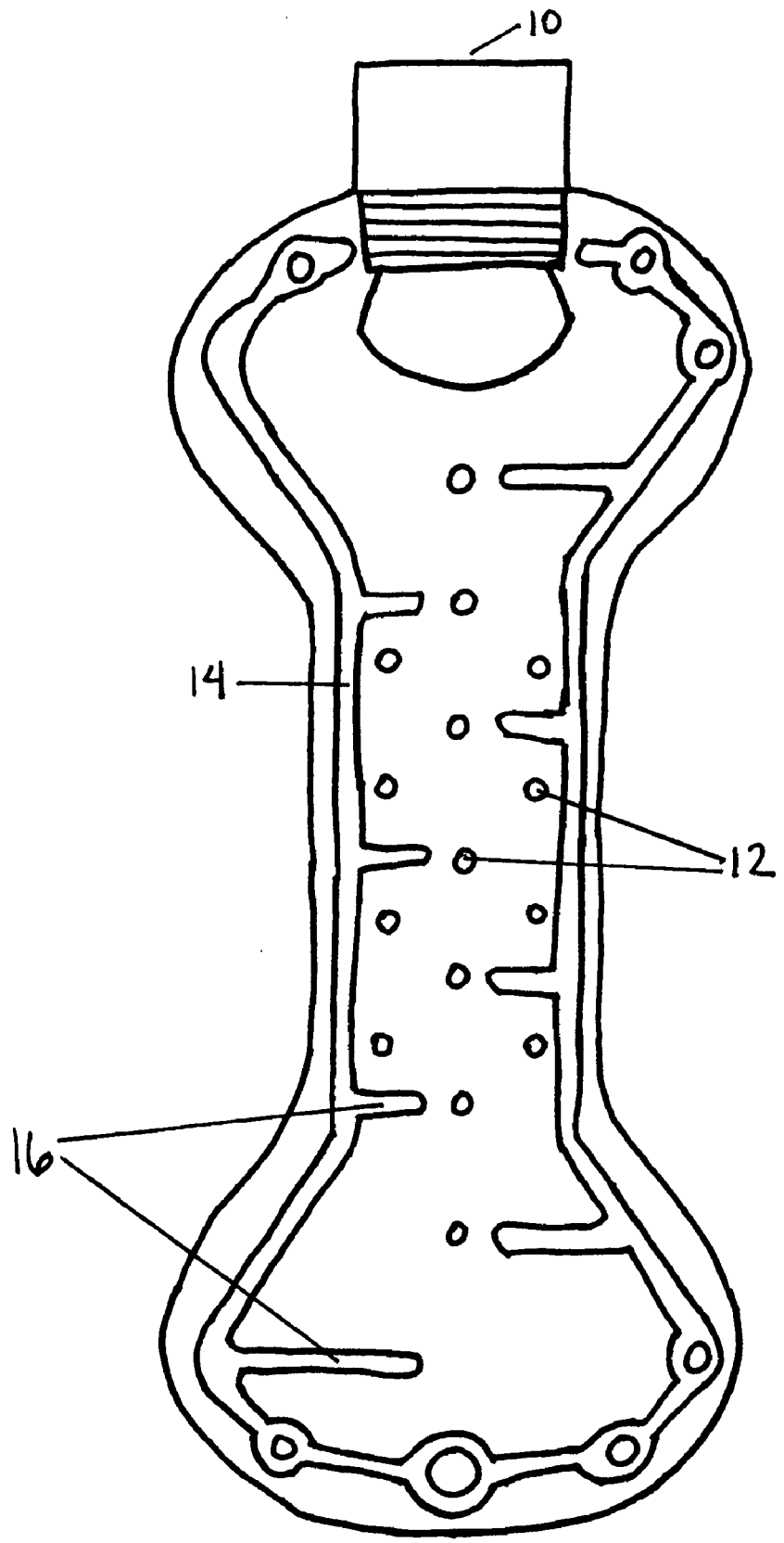
FIG. 4 is a cross-sectional view of the device taken along the length of the water sprinkler showing the top piece of the device, the hose connector threads, and the perforations.
Figure 5:
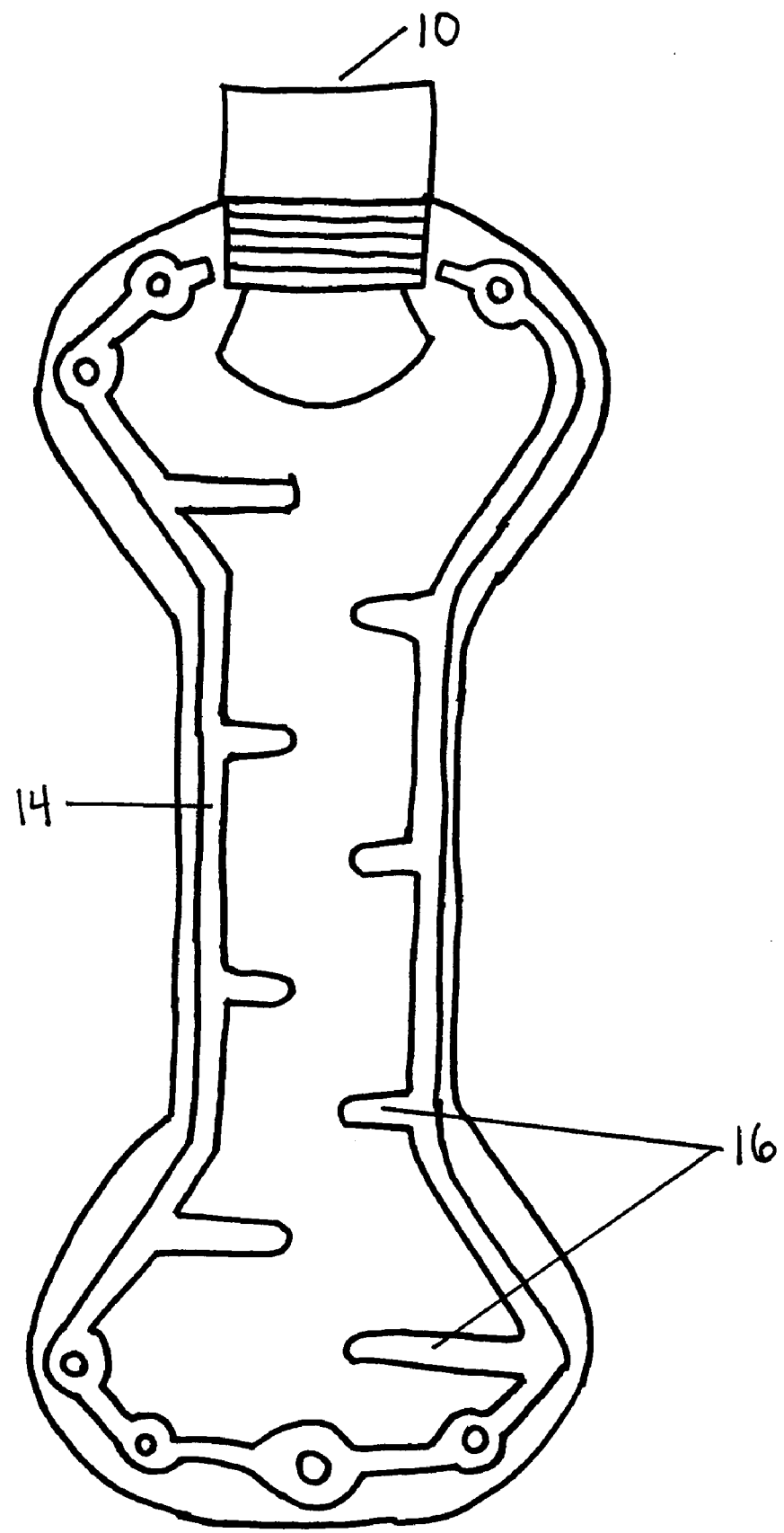
FIG. 5 is a cross-sectional view of the device take along the length of the water sprinkler showing the bottom piece of the device and the hose connector threads.
Figure 6:
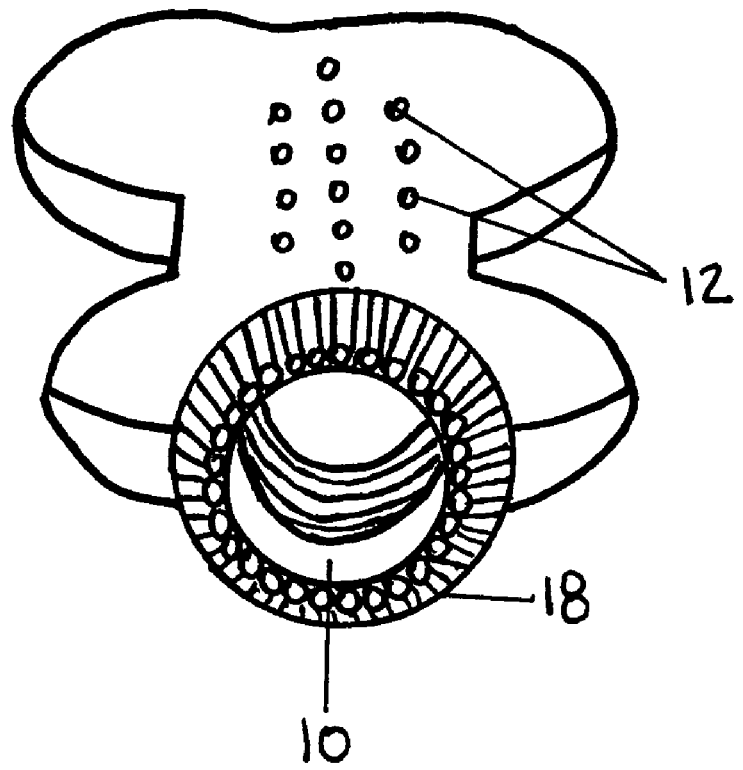
FIG. 6 shows a view of where a standard garden hose can be attached to the apparatus.
Figure 7:
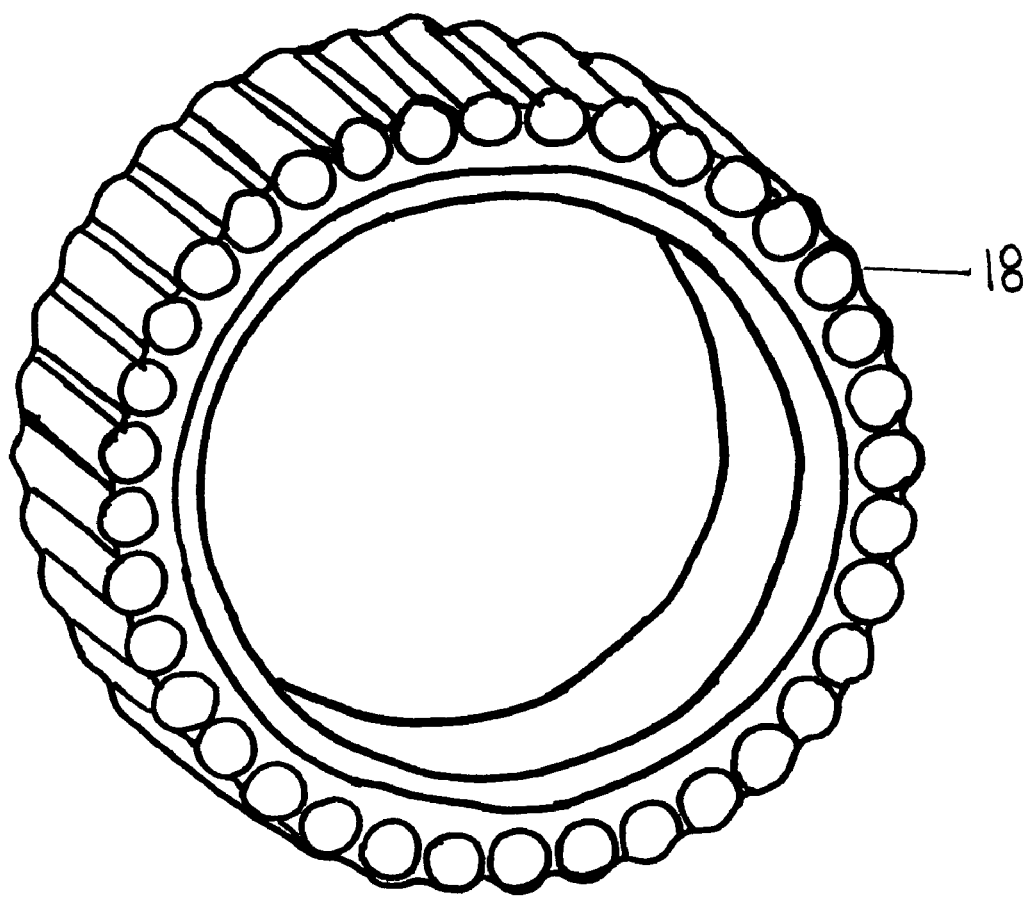
FIG. 7 shows a close up view of the protective rubber ring surrounding the hose connection on the water sprinkler.
(Note FIGS. 1, 2, 3, and 6 show horizontal and vertical lines on the device. These lines are an artifact of the Computerized-aided design (CAD) software and are not part of the design.)

FIG. 1 is a top view of the water sprinkler for dogs. When a garden hose is attached to the device at the garden hose connection (10) and the water is turned on, water sprays out of the perforations (12), the round circles on the top of the device. FIG. 1 shows fifteen perforations but any number could be used. FIGS. 2 and 3 provide additional views of the device including the sides and ends of the apparatus. FIG. 4 is a cross-sectional view of the device taken along the length of the water sprinkler. The internal cavity illustrates where the water will enter (10) and then be discharged through the perforations (12). The garden hose connector (10) is illustrated on one end of the device. The border (14) with protrusions (16) provides a surface to connect the top of the apparatus with the bottom part of the apparatus seen in FIG. 5. The top part of the device (FIG. 4) and the bottom part of the device (FIG. 5) will be bonded together along the borders (14). A side view of the device as seen in FIG. 6 illustrates the protective ring (18) structurally designed to cover the water hose connection (10) to protect it from dog's teeth and dog bites. FIG. 7 provides a closer view of the protective ring (18) design and structure. This design helps to cover the hose connectors (10) protecting the connection and decreasing a dog's chance of injury.

The water sprinkler bone was designed using the electronic Computer-aided Design (CAD) software. This software will be used to create two metal molds of the bone shaped sprinkler, a top and bottom mold. The selected material will be poured into the molds and the resulting pieces will be removed and assembled together manually by bonding the top and bottom pieces.

It is to be understand the form of this invention herewith shown and described is to be taken as a preferred example of the same, and that this invention is not to be limited to the exact arrangement of parts may be resorted to without departing from the spirit of the invention, the scope of the novel concepts thereof, or the scope of the subjoined claims.

What is claimed is:

1. A water sprinkler for dogs, said water sprinkler comprising:
    a femur shaped body comprising a molded top and a molded bottom bonded together to form an enclosed hollow chamber within said body;
    said body having an inlet connection at one end thereof for receiving an end of a water delivery hose, whereby water can be provided to said enclosed hollow chamber;
    alternating protrusions extending from opposing interior surfaces of the enclosed hollow chamber;
    said body having round perforations therein extending from an outer surface of said molded top to said enclosed hollow chamber such that, when the water delivery hose is attached to said inlet connection, water from the water delivery hose can spray from the perforations;
    said femur shaped body further comprising an elongated middle portion with two bulbous end sections, with the bulbous end sections being greater in width than said elongated middle portion.

* * * * *